United States Patent [19]

Tamarin

[11] 3,958,679
[45] May 25, 1976

[54] DECOUPLER
[75] Inventor: Carl A. Tamarin, Scottsdale, Ariz.
[73] Assignee: The Garrett Corporation, Los Angeles, Calif.
[22] Filed: Nov. 4, 1974
[21] Appl. No.: 520,826

[52] U.S. Cl. .................................. 192/45; 192/27; 192/38; 192/47; 192/91 A; 192/104 C; 64/29
[51] Int. Cl.² ............................................ F16D 3/34
[58] Field of Search .......... 192/45, 47, 48.1, 104 C, 192/91 A, 38, 71, 55, 27; 64/29

[56] References Cited
UNITED STATES PATENTS

| | | | |
|---|---|---|---|
| 1,735,125 | 11/1929 | Miller | 192/47 |
| 1,980,757 | 11/1934 | Janda | 192/27 |
| 2,991,861 | 7/1961 | Thuengen | 192/38 |
| 3,370,680 | 2/1968 | Bangerter et al. | 192/91 A |
| 3,487,900 | 1/1970 | Dahl | 192/27 |

Primary Examiner—Samuel Scott
Assistant Examiner—Randall Heald
Attorney, Agent, or Firm—Jack D. Puffer; Albert J. Miller

[57] ABSTRACT

A decoupler mechanism which provides for disengagement of a series of driving rollers from a toothed driven member by providing roller pockets for retaining the rollers by centrifugal force when the decoupler is activated.

15 Claims, 3 Drawing Figures

DECOUPLER

BACKGROUND OF THE INVENTION

This invention relates to coupling devices for coupling and decoupling a driving shaft from a prime mover to a driven shaft from which useful work may be extracted. In particular, this invention is directed to a means for decoupling such shafts such that when once decoupled they can not be recoupled until the driving shaft has come to an almost complete stop.

Such a coupling is used, for example, in the operation of an auxiliary power unit for modern jet aircraft. In this application the output shaft of the gas turbine of the auxiliary power unit is connected to drive accessories for the aircraft such as the electric power generators. In addition, the APU output shaft is selectively coupled by means of the coupling of this invention, to an air compressor input shaft. The start up procedure for the aircraft would be as follows: The APU is started by means of stored power such as a battery, with the coupling to the air compressor engaged. When the APU is at operating speed the output of the compressor is used to start the main propulsion engines. When these engines are operating, the compressor is decoupled and the APU used for accessory drive and any compressed air required by either aircraft systems is supplied by bleed air from the propulsion engines. Friction clutches are generally rather bulky if the transmitted load is large and, further, in the decoupling and coupling action wear material is deposited in the assembly where it is detrimental to the operation of the device. Further, such clutches are difficult to maintain in balance for rotation at high operational speeds. In the case of toothed or sprag clutches, it is difficult to decouple such devices while under load and such couplings generally have high point loading problems and are complex and costly to manufacture.

The present invention overcomes these disadvantages by providing a decoupling mechanism which is readily decoupled while under full load and cannot be recoupled until shafts are at near standstill condition. Further it gives the decoupling ability of a friction clutch in a much smaller precise package that can be rotated and balanced at high speeds without depositing wear material in the mechanism.

These functions are accomplished by the use of a simple hydraulic cylinder which when activated rotates a collar having pockets to receive the connecting rollers of the coupler. When these pockets are aligned with the rollers of the coupler, the centrifugal force of the rotating shaft forces the rollers into the pockets and out of engagement with the driven shaft. Since the rollers are maintained out of engagement by centrifugal force, they will not recouple until this force has been removed by stopping rotation of the shaft.

SUMMARY OF THE INVENTION

The decoupler of the instant invention is comprised of a first toothed member attached to the driven shaft and rotating therewith. There is provided a concentric ring connected to the driven shaft which retains a series of rollers in circumferentially spaced relationship about the shaft and which engage the teeth of the driven ring. The rollers are free to move radially within their slots in the retaining ring but are restrained from axial motion. A third concentric ring surrounds the roller retaining ring and is provided with a series of pockets on its inner surface. There is provided one pocket for each roller of the retaining ring. External of the third ring there is provided an actuating ring in the form of a cup-shaped member which acts as a piston of the hydraulic decoupling mechanism. There is secured in the actuating ring a pin member which engages slots in the roller retaining ring and the third ring containing the roller pockets. These slots are formed at an angle to the rotational axis of the device and are formed at opposite angles with respect to each other. As will be explained in the detailed description below, the application of hydraulic fluid under pressure to the piston member of the actuating ring causes axial movement of the ring. The axial motion of the pin of the actuating ring in the angled slots causes relative rotation between the rotor retaining ring and the third ring. This rotation causes the roller pockets in the third ring to be aligned with the rollers which are in engagement with the toothed member of the driven shaft. When the rollers are aligned with the pockets, centrifugal force of the spinning shaft will force the rollers into the pockets and out of engagement with the toothed member. As long as the third ring is rotating, the rollers will be retained in the pockets by centrifugal force. When the rollers disengage from the tooth member the driven shaft will gradually coast to a stop.

U.S. Pat. Nos. 2,002,979; 2,991,861 and 3,380,564 are cited by way of example of pertinent prior art.

DESCRIPTION OF THE INVENTION

Figure 1:
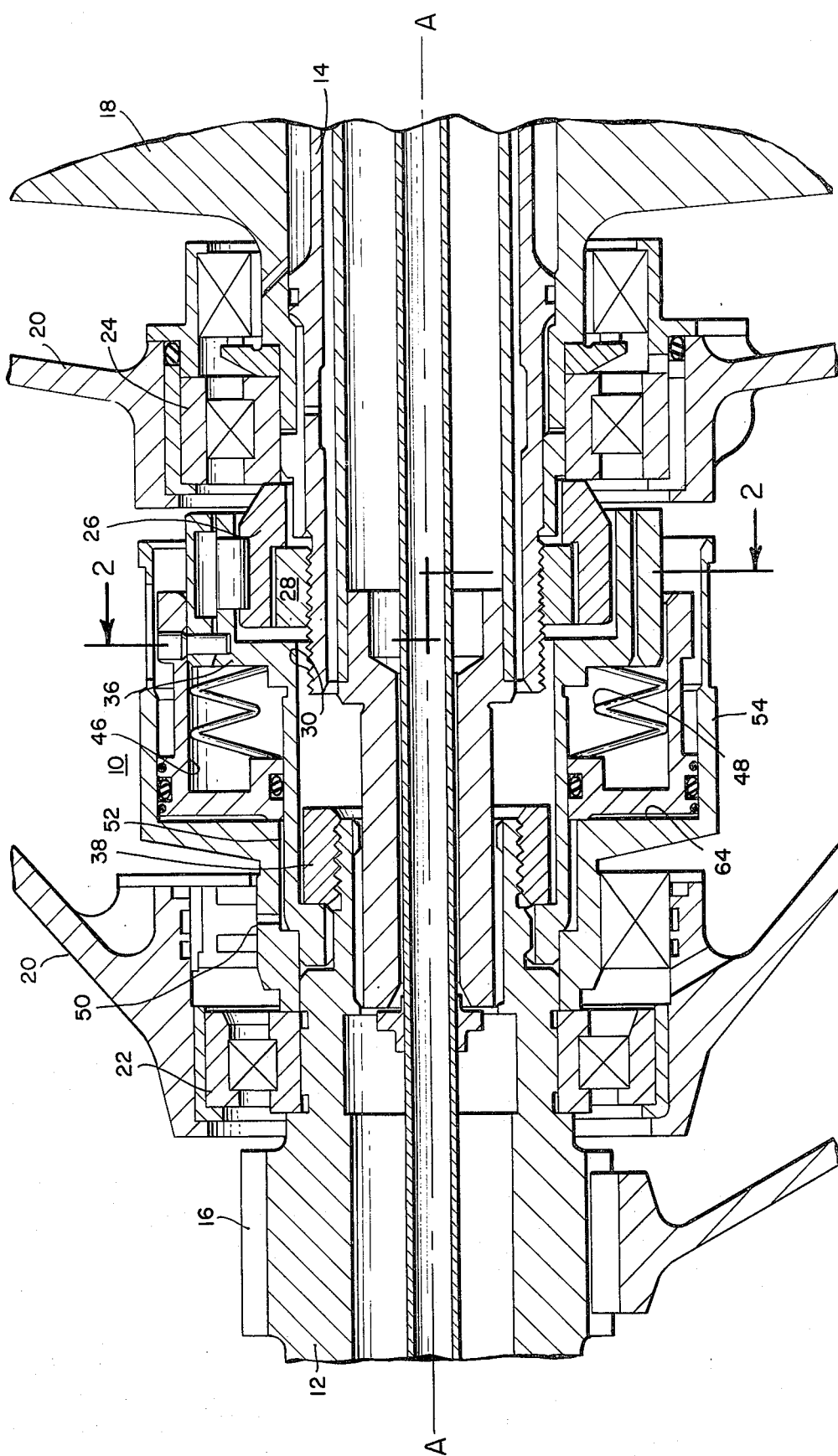
FIG. 1 is a longitudinal sectional view through the decoupler.
Figure 2:
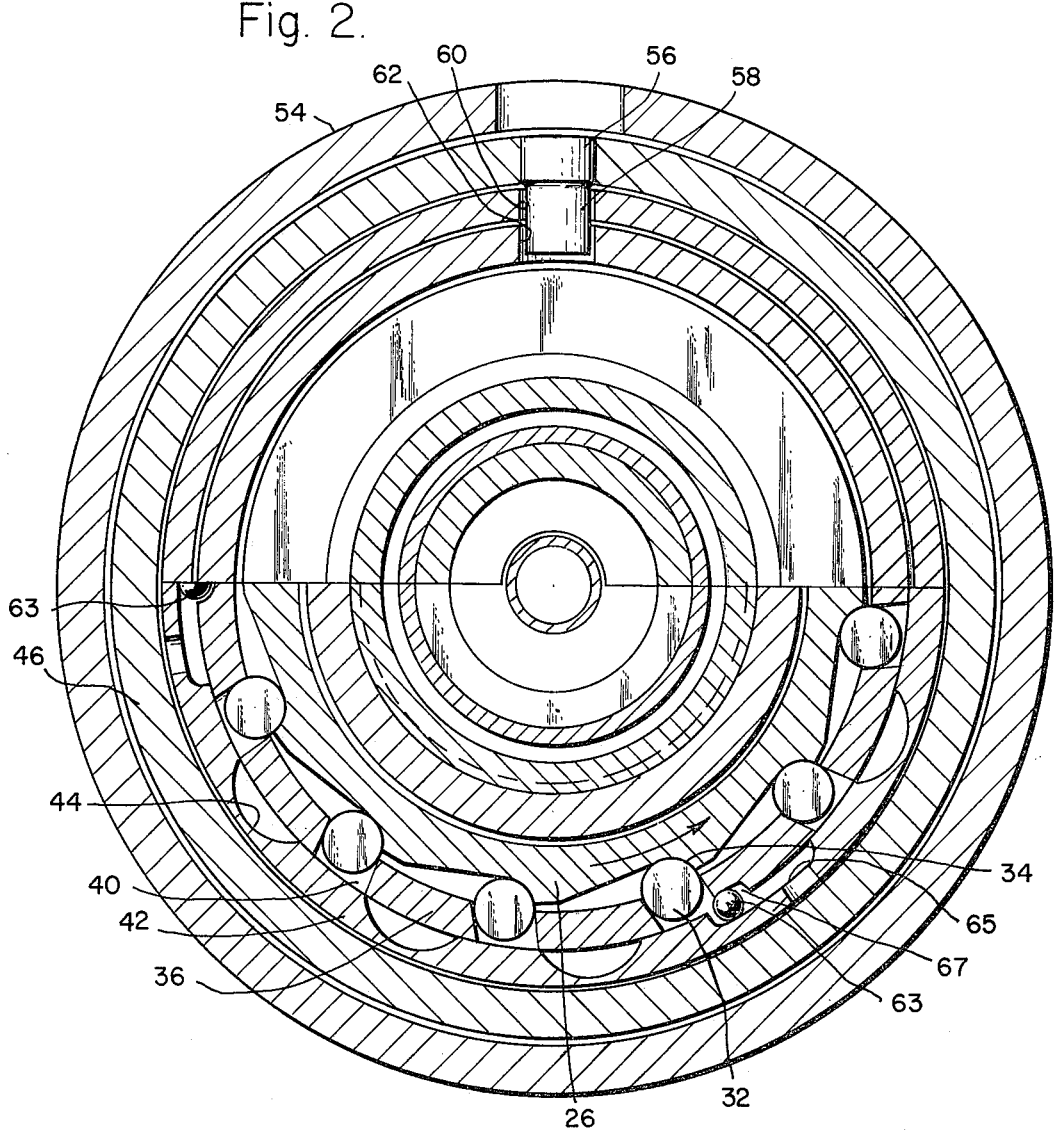
FIG. 2 is a transverse section taken along line 2—2 of FIG. 1.

Referring now to FIGS. 1 and 2 of the accompanying drawing, there is illustrated one embodiment of the coupling of this invention.

Figure 3:
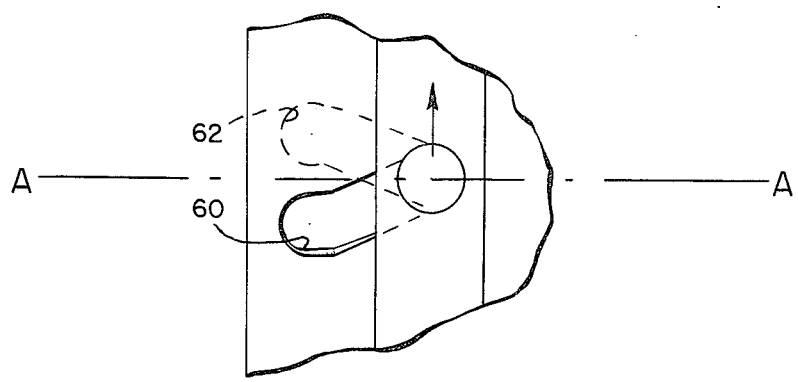
FIG. 3 is a detail of the slots of the actuating mechanism.

The coupling shown generally at 10 connects a driving shaft 12 from a primer mover such as a gas turbine engine and a driven shaft 14 arranged concentrically with the driving shaft. Shaft 12 typically carries gears such as shown at 16 for driving accessory components from the main engine shaft. Driven shaft 14 is connected to an impeller of a compressor shown partially at 18. A frame supporting the shafts is shown generally at 20 and supports the shafts by means of bearings 22 and 24 for the driving and driven shafts respectively. The driven toothed ring of the coupler is shown at 26. This ring is attached to the driven shaft 14 by means of a nut 28 and threads 30. The toothed ring 26 has provisions for accepting rollers 32 in driving engagement with a shoulder on the ring shown generally at 34 in FIG. 2. The driving ring 36 is connected to the driving shaft by means of nut 38 which retains it to a splined end of shaft 12. The driving ring 36 contains a series of slots 40 for retaining the rollers 32. When the rollers 32 are engaged with the ring 36 and the tooth member 26, the shaft will rotate together in a counterclockwise direction. Exterior of the roller retaining ring is a third concentric ring shown at 42 which contains along its inside surface a series of roller pockets 44. When in driving engagement the pockets 44 are aligned between the roller retaining slots 40. External of the third ring is an actuating ring shown generally at 46. This ring is formed generally in a cup-shape as shown in FIG. 1 and is movable axially with respect to the coupling cover 54. This ring 46 is urged in the direction of the cover by means of spring 48. By means of opening 50 and channel 52 a working fluid under pressure from a source not shown may be introduced between operating ring 46 and the cover 54 which encloses the coupling. Retaining ring 46 contains an actuating pin 56 which is attached firmly to the actuating ring. The shank portion 58 of this pin is aligned in slots 60 and 62 which are formed in the roller retaining ring and the third ring respectively. As shown in FIG. 3, these slots are formed at an angle to the rotational axis of the coupler. Further, they are formed at opposite angles to each other with respect to the central axis. The function of these slots will be explained in the operational description below.

There are provided between the third ring and the roller retaining ring locating balls 63 retained in grooves 65 and 67 for axially locating and restraining these rings.

OPERATION OF THE DEVICE

As illustrated in the drawings, the device is coupled together to cause shaft 12 to drive shaft 14 through the coupling device. When the device is to be actuated and the shafts decoupled a working fluid, usually hydraulic oil, is introduced into opening 50 in the cover member 54. This fluid then passes along channel 52 and into chambers 64 on the back side of the actuating member 46. As the pressure of this fluid is increased the actuator 46 translates axially along axis A—A compressing the spring 48. As the actuator translates the pin 56 acts upon the camming slots 60 and 62 to cause the roller retaining member 40 to rotate in one direction and the third ring 42 to rotate in an opposite direction. As these members rotate with respect to each other the pockets 44 in the third ring 42 become aligned with the slots 40 in the roller retaining ring. Since the entire assembly is rotating at a high rotational speed, the rollers 32 will be forced by centrifugal force out of the retaining ring into the roller pockets 44. As these rollers move into the pockets they become disengaged from the toothed member 26 thus disengaging shaft 14 from shaft 12.

Since the rollers are held in their respective pockets by centrifugal force, they are prevented from re-engaging the toothed member and recoupling the shafts until the driving shaft 12 has slowed to a nearly stopped position. When the shafts are not rotating the fluid pressure acting upon the actuator 46 may be relieved and the spring 48 will cause the actuator to retract to the position as shown in FIG. 1. When this occurs the roller retaining ring and the third ring will rotate back to their engaged position by the action of the pin from the camming slots and the rollers will again engage respective teeth on the driven member 26.

Thus it can be seen that there is provided by this invention a simple and compact decoupling device which will remain decoupled as long as the driving shaft is being rotated. The device provides all the advantages of a clutch type coupler in a smaller space while depositing no wear particles or other detrimental material in the system.

While specific embodiments of the invention have been illustrated and described, it is to be understood that these embodiments are provided by way of example only and that the invention is not to be construed as being limited thereto but only by the proper scope of the following claims.

What is claimed is:

1. A coupling device for selectively coupling a rotating driving shaft to a driven shaft, said coupling device comprising:
    a first ring member attached to said driving shaft and rotatable therewith;
    a second ring member concentric with said first ring member and attached to said driven shaft and rotatable therewith;
    a plurality of connector members for selectively connecting said first ring to said second ring for coupling said driving shaft to said driven shaft;
    actuating means for selectively disengaging said connector members from said second ring member, and
    means for retaining said connector means in disengagement until rotation of said first ring is substantially stopped.

2. A coupling device according to claim 1 wherein said connector means comprises a plurality of roller members circumferentially spaced in individual slots about said first ring and radially movable therein.

3. The coupling device according to claim 2 wherein said second ring member is provided with a plurality of tooth members corresponding in number to the number of roller members and in registry with the slots of said first ring when said first and second rings are in driving engagement.

4. A coupling device according to claim 3 wherein said means for retaining said connector means comprises a third ring member concentric with and surrounding said first ring member and rotatable therewith, said third ring being provided with a plurality of pockets on its interior diametral surface corresponding in number to the number of roller members; said pockets being positioned between the slots of said first ring when said coupling device is in driving engagement and being positioned in registry with said slots by said actuating means for disengaging said coupling whereby said roller members are retained in said pockets while said first ring member is rotating by the centrifugal force exerted thereon.

5. A coupling device according to claim 4 wherein said actuating means comprises means for rotating first and third ring members relative to each other about the axis of rotation of said shafts,
    said relative rotation causing said pockets of said third ring to be positioned in registry with the slots of said first ring for selectively disengaging said coupling.

6. A coupling device for selectively coupling a rotating driving shaft to a driven shaft, said coupling device comprising:
    a first ring member attached to said driving shaft and rotatable therewith, said first ring member being provided with a plurality of circumferentially spaced slots;
    a second ring member concentric with said first ring member and attached to said driven shaft and rotatable therewith, said second ring member being provided with a plurality of tooth members corresponding in number to the number of slots in said first ring member and in registry therewith when said first and second rings are in driving engagement;

a plurality of connector members for selectively connecting said first ring to said second ring for coupling said driving shaft to said driven shaft, said connector means comprising a plurality of roller members circumferentially spaced in individual slots about said first ring and radially movable therein;

means for retaining said connector means in disengagement until rotation of said first ring is substantially stopped, said means comprising a third ring member concentric with and surrounding said first ring member and rotatable therewith, said third ring being provided with a plurality of pockets on its interior diametral surface corresponding in number to the number of roller members; said pockets being positioned between the slots of said first ring when said coupling device is in driving engagement and being positioned in registry with said slots for disengaging said coupling whereby said roller members are retained in said pockets while said first ring member is rotating by the centrifugal force exerted thereon; and actuating means for selectively disengaging said connector members from said second ring member, said actuating means comprising a fourth ring member concentric with and surrounding said third ring member, rotatable with said first and third ring members and movable axially with respect thereto, said fourth ring member comprising camming means operably connected to a camming surface on said third ring whereby axial motion of said fourth ring member causes rotation of said third ring member with respect to said first ring member.

7. The coupling device according to claim 6 wherein said camming means comprises a pin member fixed in said fourth ring member and extending radially inwardly therefrom;

said third ring member having a slot in its exterior surface, said slot being formed at an angle with respect to the axis of rotation of said members;

said pin member being engaged in the slot of said third ring whereby axial motion of said pin in said fourth ring causes relative rotation of said third ring with respect to said fourth and first rings.

8. The coupling device according to claim 7 wherein said first ring is provided with a slot on its exterior surface generally in registry with the slot on said third ring, the slot in said first ring being formed at an angle with respect to the axis of rotation of said members, said angle being substantially the same angle as that of the slot on said third ring and formed in an opposite direction with respect to said rotational axis whereby axial motion of the pin of said fourth ring causes rotation of said first and third rings in opposite directions.

9. The coupling device according to claim 8 wherein said actuating means is moved axially in one direction by fluid pressure and in the opposite direction by resilient means.

10. A coupler for selectively connecting a driven shaft to a driving shaft, said coupler comprising:

a driven ring attached to said driven shaft and having a plurality of teeth spaced about its exterior surface;

a driving ring surrounding said driven ring and concentric therewith, said driving ring having a plurality of connector means corresponding in number to the number of teeth on said driven ring for coupling said driving ring to said driven ring when engaged with the teeth of said driven ring;

actuator means for selectively disengaging said connector means from said driven ring, and means for retaining said connector means in a disengaged position until rotation of said driving shaft is substantially stopped.

11. The coupler of claim 10 wherein said driving ring is provided with a plurality of radially extending slots in registry with the teeth of said driven ring when said coupler is in the engaged condition and said connector means comprises a plurality of rollers, one roller being positioned in each of the slots of said driving ring and radially movable therein, each of said rollers engaging one of the teeth of said driven ring and the corresponding slot of said driving ring when the coupler is in the engaged condition.

12. The coupler of claim 11 wherein the means for retaining said connector means comprises a third ring concentric with and surrounding said driving ring, said third ring having a plurality of cavities formed on its inner diametral surface corresponding in number and spacing to the slots on said driving ring, said pockets being out of registry with said slots when said coupler is in the engaged condition and rotatable into registry with said slots by said actuator means to place said coupler in the disengaged condition said cavities being of a size and shape to receive and retain said connector means by centrifugal force while said driving shaft is rotating.

13. A coupler for selectively connecting a driven shaft to a driving shaft, said coupler comprising:

a driven ring attached to said driven shaft and having a plurality of teeth spaced about its exterior surface;

a driving ring surrounding said driven ring and concentric therewith, said driving ring having a plurality of connector means corresponding in number to the number of teeth on said driven ring for coupling said driving ring to said driven ring when engaged with the teeth of said driven ring, said driving ring being provided with a plurality of radially extending slots in registry with the teeth of said driven ring when said coupler is in the engaged condition and said connector means comprises a plurality of rollers, one roller being positioned in each of the slots of said driving ring and radially movable therein, each of said rollers engaging one of the teeth of said driven ring and the corresponding slot of said driving ring when the coupler is in the engaged condition;

means for retaining said connector means in a disengaged position until rotation of said driving shaft is substantially stopped, said means comprising a third ring concentric with and surrounding said driving ring, said third ring having a plurality of cavities formed on its inner diametral surface corresponding in number and spacing to the slots on said driving ring, said pockets being out of registry with said slots when said coupler is in the engaged condition and rotatable into registry with said slots to place said coupler in the disengaged condition said cavities being of a size and shape to receive and retain said connector means by centrifugal force while said driving shaft is rotating; and actuator means for selectively disengaging said connector means from said driven ring, said actuator comprising:

an axially movable cup-shaped member rotatable with said driving shaft, the wall of said cup being concentric with and encircling said third ring; a pin member attached to said cup and extending radially inwardly therefrom to engage camming slots formed in said third ring and said driving ring, said slots being formed at an angle with respect to the rotational axis of said rings and in opposite directions with respect to each other such that axial motion of said cup and pin causes rotational motion of said third and driving rings in opposite directions; means forming a fluid tight chamber between the outer face of said cup member and a portion of said driving shaft; and conduit means for introducing a fluid under pressure into said chamber for causing said cup member to move axially along its axis of rotation when said pressurized fluid is introduced into said cavity; and spring means for returning said cup means to be disengaged position when said pressurized fluid is removed from said chamber.

14. A method of decoupling a driven shaft from a rotating driving shaft wherein said driven shaft has a toothed ring member; said driving shaft has a slotted ring member concentrically encircling said toothed ring; roller members engaging said slot and said teeth and a third ring concentrically encircling said slotted rings having roller receiving pockets on the inner diametral surface thereof; and an axially movable fluid actuator for rotating said third ring; the method comprising:
  introducing pressurized fluid into said actuator; p1 translating said actuator in an axial direction;
  rotating said third ring with respect to said slotted ring to a point where said roller receiving pockets are aligned with the slots of the ring member of said driving shaft whereby said rollers are forced into said pockets by centrifugal force.

15. A coupling device for selectively coupling a rotating driving shaft to a driven shaft, said coupling device comprising:
  a first ring member attached to said driving shaft and rotatable therewith;
  a second ring member concentric with said first ring member and attached to said driven shaft and rotatable therewith;
  connector means comprising a plurality of roller members circumferentially spaced in individual slots about said first ring and radially movable therein;
  a third ring member concentric with and surrounding said first ring member and rotatable therewith, said third ring being provided with a plurality of pockets on its interior diametral surface corresponding in number to the number of roller members; said pockets being positioned between the slots of said first ring when said coupling device is in driving engagement and being positioned in registry with said slots for disengaging said coupling means;
  actuator means for rotating said third ring with respect to said first ring to position the pockets of said third ring in registry with the slots of said first ring, said actuator comprising an axially movable member operatively connected to said third ring by cam means, said cam means acting to rotate said third ring in response to axial movement of said axially movable means, said connector means being placed in said pockets and retained therein by centrifugal force during rotation of said driving shaft.

* * * * *

UNITED STATES PATENT AND TRADEMARK OFFICE
CERTIFICATE OF CORRECTION

PATENT NO. : 3,958,679
DATED : May 25, 1976
INVENTOR(S) : Carl A. Tamarin

It is certified that error appears in the above-identified patent and that said Letters Patent are hereby corrected as shown below:

Column 7, line 31, delete "pl" at the end of the line.

Signed and Sealed this

Seventeenth Day of August 1976

[SEAL]

Attest:

RUTH C. MASON
*Attesting Officer*

C. MARSHALL DANN
*Commissioner of Patents and Trademarks*